(12) United States Patent
Tateishi (10) Patent No.: US 7,206,161 B2
(45) Date of Patent: Apr. 17, 2007

(54) SERVO TRACK VERIFICATION APPARATUS AND SERVO WRITER (75) Inventor: Seiji Tateishi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/338,786

(22) Filed: Jan. 25, 2006

(65) Prior Publication Data
US 2006/0187569 A1 Aug. 24, 2006

(30) Foreign Application Priority Data
Feb. 18, 2005 (JP) ............................. 2005-041663

(51) Int. Cl.
G11B 21/02 (2006.01)
(52) U.S. Cl. ..................................... 360/75; 360/77.12
(58) Field of Classification Search .................. 360/75, 360/77.12, 78.01, 78.02, 78.05, 53, 261.1, 360/291, 241.3; 250/548
See application file for complete search history.

(56) References Cited

U.S. PATENT DOCUMENTS

| 4,472,750 | A | * | 9/1984 | Klumpp et al. | .......... | 360/78.01 |
| 4,639,796 | A | * | 1/1987 | Solhjell | .................... | 360/77.12 |
| 5,050,017 | A | * | 9/1991 | Carr et al. | ................ | 360/77.12 |
| 5,294,791 | A | * | 3/1994 | Pahr | ............................ | 250/548 |
| 5,379,165 | A | * | 1/1995 | Pahr | ......................... | 360/78.02 |
| 5,452,153 | A | * | 9/1995 | Baheri et al. | ............. | 360/78.05 |
| 5,617,269 | A | * | 4/1997 | Gordenker et al. | ...... | 360/77.12 |
| 6,021,013 | A | * | 2/2000 | Albrecht et al. | ............. | 360/53 |
| 6,031,673 | A | * | 2/2000 | Fasen et al. | .................... | 360/53 |
| 6,570,731 | B2 | * | 5/2003 | Burke et al. | .................. | 360/75 |
| 6,865,050 | B2 | | 3/2005 | Nakao et al. | | |
| 7,106,544 | B2 | * | 9/2006 | Dugas et al. | ................. | 360/75 |

FOREIGN PATENT DOCUMENTS

JP 2002-367101 A 12/2002

* cited by examiner

Primary Examiner—Fred F. Tzeng
(74) Attorney, Agent, or Firm—Sughrue Mion, PLLC (57) ABSTRACT A servo track formed on a tape-like recording medium is verified. An input unit allows a user to input information. A tape drive unit causes the tape-like recording medium to run on a predetermined route. A measurement unit is provided adjacent to the predetermined route of the tape-like recording medium and configured to detect the servo track on the running tape-like recording medium driven by the tape drive unit, to output a track detection signal. A storage unit stores a plurality of functions each of which is uniquely determinable by the information to be provided through the input unit. An arithmetic unit is configured to determine an oscillation amount of the servo track from the track detection signal output from the measurement unit, using a function determined on the basis of the information provided through the input unit. The function used for determining the oscillation amount of the servo track is retrievable from among the plurality of functions stored in the storage unit.

20 Claims, 6 Drawing Sheets

| INPUT INFORMATION $I_n$ | DETAILS |
|---|---|
| FORMAT TYPE INFORMATION $Q_n$ ($Q_1$, $Q_2$, ···) | PATTERN TYPE |
| | PRESCRIBED SIZE OF FRAME |
| | PRESCRIBED AZIMUTH ANGLE |
| CONTROL INFORMATION $R_n$ ($R_1$, $R_2$, ···) | TAPE TRANSPORT SPEED v |
| | WRITE OPERATION FREQUENCY f |
| | CONTROL CORRECTION COEFFICIENT |
| DETERMINATION INFORMATION $T_n$ ($T_1$, $T_2$, ···) | OK/NG THRESHOLD |
| | DETERMINATION LENGTH |
| | VERIFICATION LENGTH |

SERVO TRACK VERIFICATION APPARATUS AND SERVO WRITER

CROSS-REFERENCE TO RELATED APPLICATIONS

This application claims the foreign priority benefit under Title 35, United States Code, § 119 (a)–(d), of Japanese Patent Application No. 2005-041663, filed on Feb. 18, 2005 in the Japan Patent Office, the disclosure of which is herein incorporated by reference in its entirety.

BACKGROUND OF THE INVENTION

This invention relates to verification of a servo track formed on a tape-like recording medium and used to exercise track-following servo control over heads for writing or reading data onto or from the tape-like recording medium. More specifically, apparatuses and methods consistent with the present invention relate to a servo track verification apparatus, a servo track verification method, and a servo writer having a capability of servo track verification, adaptable to multiple format types of servo patterns.

The never-failing need for increased storage capacity of tape-like recording media has been giving the technicians a challenge to achieve greater storage density of recorded data. In areas other than data-recordable areas on a tape-like recording medium, servo tracks in which servo patterns are written are formed along the length of the tape-like recording medium. The servo tracks are used to allow read/write heads to trace data tracks on the tape-like recording medium; it would therefore be desirable to write the servo patterns on the servo tracks of the tape-like recording medium with a great degree of precision.

The servo patterns are written to form the servo tracks on the tape-like recording medium during manufacturing at the factory, and are inspected using a servo track verification apparatus under strict quality controls to verify the precision of the servo tracks formed on the tape-like recording medium. The applicant has previously proposed such a verification apparatus in JP 2002-367101 A and its family U.S. Pat. No. 6,865,050 issued on Mar. 8, 2005, the disclosure of which is herein incorporated by reference in its entirety.

The format types of servo patterns written in the servo tracks differ among standards of the tape-like recording medium, and manufacturers of tape-like recording media are equipped with multiple servo track verification apparatuses of different types corresponding to the format types of different standards of media to be provided. Accordingly, a large capital investment, as thus required, in equipment of the multiple servo track verification apparatuses for respective standards of media would disadvantageously cause a squeeze on profits. Further, replacement of equipment in a production line for changing the standards of the tape-like recording medium to be manufactured would disadvantageously involve enormous labor in updating the system, thus reducing the productivity.

Against this backdrop, the present invention has been made in an attempt to eliminate the above disadvantages.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

It is an aspect of the present invention to provide a servo track verification apparatus for verifying a servo track formed on a tape-like recording medium, comprising: an input unit allowing a user to input information; a tape drive unit causing the tape-like recording medium to run on a predetermined route; a measurement unit provided adjacent to the predetermined route of the tape-like recording medium and configured to detect the servo track on the running tape-like recording medium driven by the tape drive unit, to output a track detection signal; a storage unit storing a plurality of functions each of which is uniquely determinable by the information to be provided through the input unit; and an arithmetic unit configured to determine an oscillation amount of the servo track from the track detection signal output from the measurement unit, using a function determined on the basis of the information provided through the input unit, the function used for determining the oscillation amount of the servo track being retrievable from among the plurality of functions stored in the storage unit. With this construction, a single servo track verification apparatus is enabled to conduct verification of servo tracks having a variety of format types formed on different types of tape-like recording media.

In the above construction, the tape-like recording medium may comprise a magnetic tape. The servo track formed on the magnetic tape may comprise a series of frames each composed of two or more slanting stripes including at least one pair of nonparallel stripes. The track detection signal may comprise a time-interval signal indicative of time intervals between detections of the stripes on the running magnetic tape, the time intervals being measured by the measurement unit when the stripes sequentially pass through the measurement unit. In this embodiment, a magnetic tape having servo tracks that can be handled by a timing-based track-following servo system can be subjected to verification of servo tracks. The measurement unit may comprise: a pattern detector provided adjacent to the predetermined route of the magnetic tape to detect the stripes on the running magnetic tape and output an analog detection signal; a detector driver connected with the pattern detector to power the pattern detector; a detection signal amplifier amplifying the analog detection signal output from the pattern detector to output an amplified analog signal; a pulse generator converting the amplified analog signal output from the detection signal amplifier into a pulse signal; and a pulse interval timer receiving the pulse signal to measure pulse intervals of the pulse signal indicative of the time intervals between the stripes that sequentially pass through the pattern detector, and outputting the time-interval signal as the track detection signal to the arithmetic unit.

Alternatively, the tape-like recording medium may comprise an optical tape. The servo track formed on the optical tape may comprise a series of dots. The track detection signal may comprise an intensity signal indicative of intensities of light reflected from areas on the running optical tape where the dots are provided, the intensities of light being measured by the measurement unit when the dots sequentially pass through the measurement unit. In this embodiment, an optical tape having servo tracks that can be handled by an optical track-following servo system can be subjected to verification of servo tracks. The measurement unit may comprise: a pattern detector comprising a light-emitting element directing two beams of low-energy laser light toward the areas on the running optical tape where the dots are provided and a light-receiving element detecting the two beams of low-energy laser light reflected from the running optical tape, to output an analog intensity signal indicative of intensities of the two beams of low-energy laser light detected by the light-receiving element; a detector driver connected with the pattern detector to power the pattern detector; a detection signal amplifier amplifying the analog intensity signal output from the pattern detector to output an amplified analog intensity signal; a peak detector tracking the amplified analog intensity signal output from the detection signal amplifier, sampling a highest value of the amplified analog intensity signal and holding the highest value for a predetermined period of time; and an analog-to-digital converter converting the highest value held for the predetermined period of time by the peak detector into a digital value, and outputting the digital value as the intensity signal to the arithmetic unit. The light-emitting element of the pattern detector may be configured to direct the two beams of low-energy laser light toward spots on or outside opposite side edges of the dots formed on the running optical tape.

In one embodiment, the information provided through the input unit may comprise information of at least one type selected from the group consisting of format type information, control information and determination information. The control information may comprise a tape transport speed, a write operation frequency and a control correction coefficient In another embodiment, the above servo track verification apparatus may further comprise: an interface unit providing connectivity with at least one peripheral device through which a function other than the plurality of functions stored in the storage unit is loadable.

In yet another embodiment, the information provided through the input unit may comprise a function other than the plurality of functions stored in the storage unit.

In yet another embodiment, the above servo track verification apparatus may further comprise a determination unit configured to make a determination as to whether the servo track is formed within a permissible range of deviation, based on the oscillation amount of the servo track determined by the arithmetic unit, using determination information provided through the input unit, wherein the determination information comprises a threshold indicative of the permissible range of deviation of the servo track. In this embodiment, the determination information may further comprise at least one of a determination length indicative of a unit length of the tape-like recording medium in which determination is made, and a verification length indicative of a unit length of the tape-like recording medium with which one cycle of verification steps deals. Alternatively or optionally, the servo track verification apparatus may further comprise an output unit allowing the user to see at least one of the information input by the user, the oscillation amount determined by the arithmetic unit, and the determination made by the determination unit as to whether the servo track is formed within the permissible range of deviation.

In yet another embodiment, the arithmetic unit may be configured to determine the function on the basis of one of format type information provided through the input unit, and combination of the format type information and control information provided through the input unit.

In yet another embodiment, the servo track verification apparatus may further comprise an output unit allowing the user to see at least one of the information input by the user, and the oscillation amount determined by the arithmetic unit.

In another aspect of the present invention, there is provided a servo writer comprising: a servo track verification apparatus as described above; and a servo pattern write unit provided in a position upstream of the measurement unit adjacent to the predetermined route of the tape-like recording medium, to write the servo track on the running tape-like recording medium.

In yet another aspect of the present invention, there is provided a servo track verification method for verifying a servo track formed on a tape-like recording medium. The servo track verification method comprises: allowing a user to input information through an input unit, wherein the information comprises format type information and determination information; determining a function on the basis of one of the format type information, and combination of the format type information and control information provided through the input unit; causing the tape-like recording medium to run on a predetermined route; detecting the servo track on the running tape-like recording medium to output a track detection signal; determining an oscillation amount of the servo track from the track detection signal using the function determined; and making a determination as to whether the servo track is formed within a permissible range of deviation, based on the oscillation amount of the servo track, using the determination information, wherein the determination information comprises a threshold indicative of the permissible range of deviation of the servo track.

In the above method, the above step of determining the function may comprise at least one of the following steps: (1) retrieving the function corresponding to the information provided through the input unit, from a storage unit storing a plurality of functions each of which is uniquely determinable by the information to be provided through the input unit; (2) loading the function corresponding to the information provided through the input unit, from an outside resource connected through an interface unit which provides connectivity with at least one peripheral device through which a function other than the plurality of functions stored in the storage unit is loadable; and (3) allowing a user to input through the input unit the function corresponding to the information provided through the input unit.

BRIEF DESCRIPTION OF THE DRAWINGS

The above and other aspects, advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

A detailed description will be given of exemplary embodiments of the present invention with reference to the drawings.

First Embodiment

Referring now to FIGS. 1 through 4, a servo track verification apparatus as a first embodiment of the present invention will be taken up for discussion.

1. Servo Tracks

The first embodiment of the present invention relates to a magnetic track-following servo system.

Figure 2A:
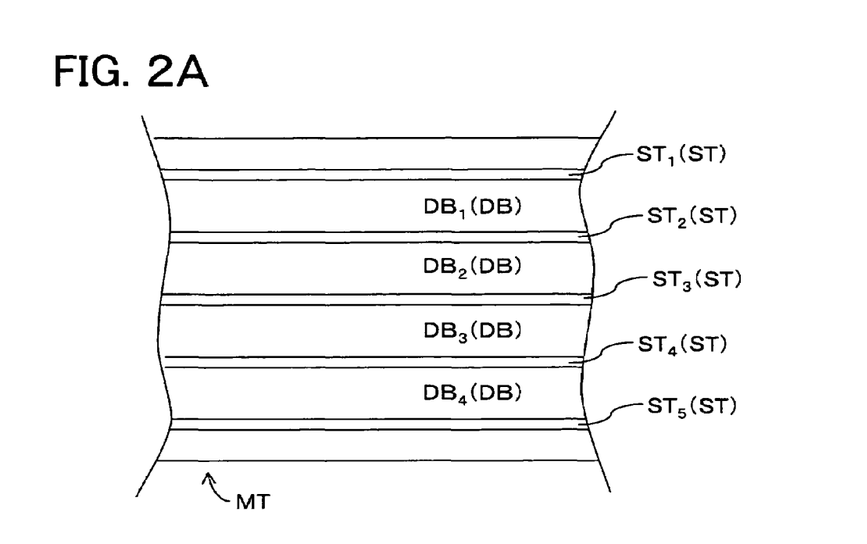
FIG. 2A is a diagram of a magnetic tape as a tape-like recording medium depicted across the full width, in which a plurality of data bands lying along the length of the tape and arranged in the transverse direction of the tape are defined with servo tracks to be verified by the servo track verification apparatus according to the first embodiment of the present invention.
Figure 2B:
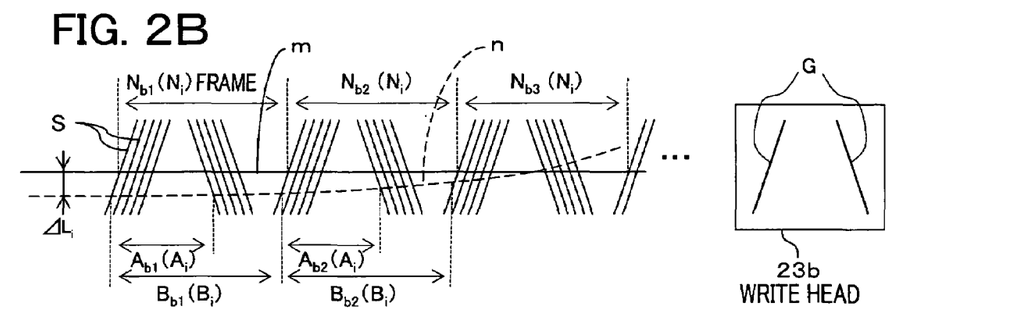
FIG. 2B is a diagram of an exemplified format type of magnetic servo patterns written in a servo track.
Figure 2C:
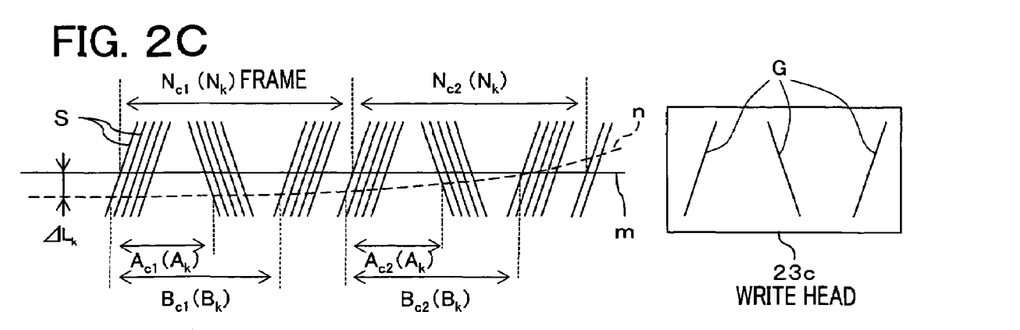
FIG. 2C is a diagram of another exemplified format type of magnetic servo patterns written in a servo track.

Prior to the discussion on the servo track verification apparatus according to the present embodiment, this section will focus, at the outset, on the servo tracks made up of magnetic servo patterns written on a magnetic tape with reference to FIGS. 2A, 2B and 2C.

As shown in FIG. 2A, on a magnetic tape MT (tape-like recording medium) are formed a number of (four in the illustrated example) data bands DB ($DB_1$, $DB_2$, $DB_3$ and $DB_4$) lying along the length of the magnetic tape MT and arranged in the transverse direction (between top and bottom edges in the illustrated example) of the magnetic tape MT. Each of these data bands DB ($DB_1$, $DB_2$, $DB_3$ and $DB_4$) is subdivided into a plurality of data tracks (not shown) to provide areas in which data are recordable.

Borders defining the data bands DB ($DB_1$, $DB_2$, $DB_3$ and $DB_4$) are formed with servo tracks ST ($ST_1$, $ST_2$, $ST_3$, $ST_4$ and $ST_5$) in which servo patterns are written as shown in FIGS. 2B and 2C.

Referring to FIGS. 2B and 2C, in which one of the servo tracks ST is magnified, servo patterns are formed in the servo track ST. The servo patterns with which each servo track ST is formed include a series of frames that are formed identically in shape and size, and arranged at regular spacings, as illustrated by $N_i$ in FIG. 2B and by $N_k$ in FIG. 2C. Each frame $N_i$, $N_k$ is composed of two or more slanting stripes S. Although ten stripes S make up each frame $N_i$ as illustrated in FIG. 2B and fifteen stripes S make up each frame $N_k$ as illustrated in FIG. 2C in this example, it is to be understood that the number of stripes S in each frame $N_i$, $N_k$ is exemplary only, and any number more than one of slanting stripes S may be provided in each frame as long as the frame includes at least one pair of nonparallel stripes S.

During recording of data on the magnetic tape MT, a magnetic head writes data in data tracks within a data band while detecting position information of a servo track ST corresponding to the data band in such a manner that the data tracks never overlap each other within the data band based upon the detected position information of the servo track ST. During retrieval of data on the magnetic tape MT, a magnetic head reads data from a data track while detecting position information of a servo track ST in such a manner that a specific data track is traced precisely based upon the detected position information of the servo track ST. Thus, the servo track ST is utilized as a reference for driving a magnetic head during recording/retrieval of data in data tracks on the magnetic tape MT. Accordingly, precise positioning of the servo track ST without deviation (oscillation) in the transverse direction of the magnetic tape MT would be desirable. Therefore, a magnetic tape MT having a servo track ST formed beyond a permissible range of deviation is discarded during a verification process because such a servo track would make the recording and retrieval of data on the magnetic tape MT unstable.

2. Servo Track Verification Apparatus

Figure 1:
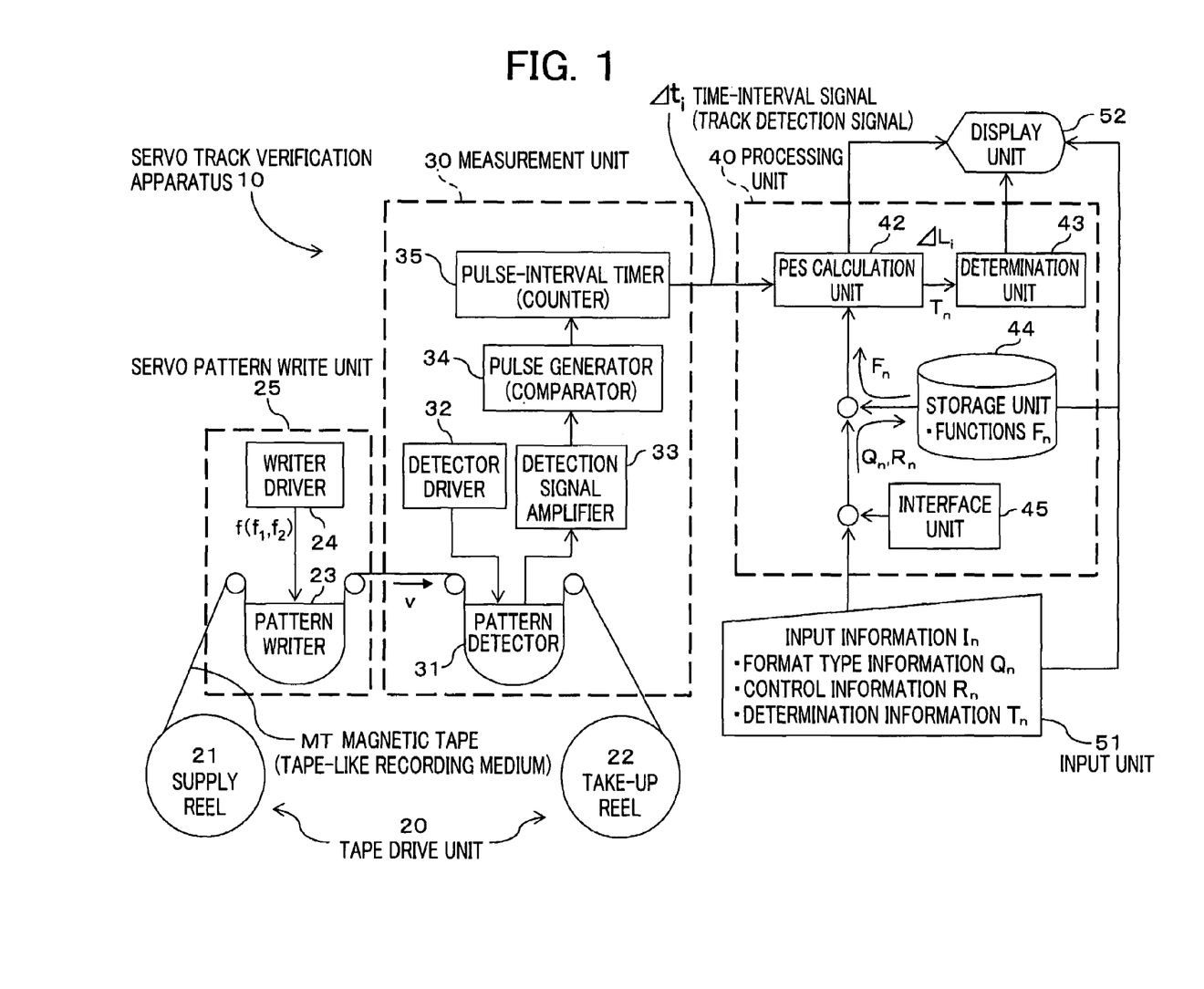
FIG. 1 is a block diagram showing principal components of a servo track verification apparatus or a servo writer for inspecting magnetic servo patterns, according to a first exemplified embodiment of the present invention.

A servo track verification apparatus 10 for quantitatively determining an oscillation amount $\Delta L_i$ of a servo track formed on a magnetic tape MT according to the present embodiment will now be described in detail with reference to FIG. 1. As shown in FIG. 1, the servo track verification apparatus 10 according to the first embodiment includes a tape drive unit 20, a measurement unit 30, a processing unit 40, an input unit 51, and a display unit 52.

The tape drive unit 20 includes a supply reel 21 and a take-up reel 22, and is configured to cause the magnetic tape MT to run on a predetermined route from the supply reel 21 to the take-up reel 22. In one embodiment, the supply reel 21 is wound with a magnetic tape MT on which no servo track is formed, and the servo track verification apparatus 10 is incorporated in a servo writer which includes a servo pattern write unit 25 adapted to write servo patterns in servo tracks on the running magnetic tape MT, as shown in FIG. 1. The phrase "writing servo patterns in servo tracks" on the running magnetic tape MT or other types of tape-like recording media will be simply referred to as "writing servo tracks (or a servo track)", where appropriate. The servo pattern write unit 25 that will be described later is provided in a position upstream of a measurement unit 30 that will be described later, adjacent to the predetermined route on which the magnetic tape MT runs between the supply reel 21 and the take-up reel 22. In another embodiment, the supply reel 21 is wound with a magnetic tape MT on which a servo track is formed (see FIG. 2A), and a servo pattern write unit 25 is not provided between the supply reel 21 and the take-up reel 22. The take-up reel 22 takes up the running magnetic tape MT supplied from the supply reel 21. The magnetic tape MT is guided to run on the predetermined route between the reels 21 and 22, steadily at a predetermined transport speed v without excessive deviation (oscillation) in the transverse direction.

In one embodiment, the tape drive unit 20 may include a capstan roller (not shown) around which the magnetic tape MT wraps so that the capstan roller may exert a driving force on the magnetic tape MT to improve transport stability of the magnetic tape MT. Ideally, the tape drive unit 20 is configured to proactively cause the magnetic tape MT to run stably without deviation (within a permissible range of deviation) in the transverse direction; rather, in one embodiment, the tape drive unit 20 may preferably have a functionality of reactively correcting such transverse deviation that could occur in the running magnetic tape MT, for example, by detecting edge positions of the running magnetic tape MT, or otherwise.

The servo pattern write unit 25 includes a pattern writer 23 and a writer driver 24, and is configured to write servo patterns in servo tracks ST on the magnetic tape MT. As described above, the servo track verification apparatus 10 may be provided with such a servo pattern write unit 25, and the apparatus 10 with the servo pattern write unit 25 as illustrated in FIG. 1 is typically called "servo writer" in view of its servo pattern writing capability.

The magnetic tape MT runs substantially in contact with a write element (not shown) of the pattern writer 23. The write element of the pattern writer 23 facing the running magnetic tape MT is constructed as illustrated in FIGS. 2B and 2C (see write heads designated by reference numerals 23b, 23c), with magnetic gap(s) G corresponding to a unit servo pattern (e.g., of a frame $N_i$, $N_k$ composed of five-time repeated patterns of stripes S). The write gap G induces magnetic (flux) leakage, which in turn changes the direction of magnetization of a portion of the magnetic layer of the magnetic tape MT in close proximity to the write gap G.

The writer driver 24 is connected with the pattern writer 23 to dynamically change the direction of magnetic field produced at the magnetic gap G of the pattern writer 23 with a write operation frequency f. The servo patterns shown in FIGS. 2B and 2C are obtained as a result of a specific operation of the writer driver 24 such that four write operations with write operation frequency $f_1$ followed by one write operation with write operation frequency $f_2$ ($<f_1$) are repeated. Spacings between adjacent stripes S written by the same write gap G are determined by the write operation frequency f (combination of frequencies $f_1$ and $f_2$) and the transport speed v of the magnetic tape MT.

The measurement unit 30 includes a pattern detector 31, a detector driver 32, a detection signal amplifier 33, a pulse generator (comparator) 34, and a pulse interval timer (counter) 35. The measurement unit 30 is configured to detect the stripes S that are formed in servo tracks ST on the running magnetic tape MT and sequentially passes through the measurement unit 30, and to measure time intervals between the stripes S, thereby outputting a time-interval signal $\Delta t_i$ as a track detection signal to the processing unit 40.

The pattern detector 31 is provided adjacent to the transport route of the magnetic tape MT. The magnetic tape MT runs substantially in contact with a read element (not shown) of the pattern detector 31. The read element of the pattern detector 31 facing the running magnetic tape MT is disposed in such a position relative to the servo track ST that the trajectory n (see FIGS. 2B and 2C) of the write element passes across the stripes S. The pattern detector 31 detects the stripes S that sequentially pass therethrough as the trajectory n intersects the stripes S one after another. In this embodiment, where the tape-like recording medium subjected to verification includes a magnetic tape MT, the pattern detector 31 recognizes the presence of a stripe S by sensing a variation of magnetization at a boundary of the stripe S. Specifically, the pattern detector 31 may include an inductive head, a magneto-resistive (MR) head or other types of read heads known in the art, but not limited thereto as long as it has a capability of detecting the stripes S on the running magnetic tape MT and outputting an analog detection signal.

The detector driver 32 connected with the pattern detector 31 as shown in FIG. 1 is configured to power the pattern detector 31 so that the pattern detector 31 operates as described above.

The detection signal amplifier 33 connected with the pattern detector 31 as shown in FIG. 1 is configured to amplify the feeble analog detection signal output from the pattern detector 31.

The pulse generator 34 connected with the detection signal amplifier 33 as shown in FIG. 1 is configured to convert the analog detection signal that is output from the pattern detector 31 and amplified by the detection signal amplifier 33 into a pulse signal, for example, by changing the analog signal into a digital (two-valued) signal using a threshold. The pulse signal output from the pulse generator 34 exhibits pulse intervals corresponding to timing (time intervals) of detection of the stripes S made by the pattern detector 31 on the running magnetic tape MT.

The pulse interval timer 35 connected with the pulse generator 34 as shown in FIG. 1 is configured to receive the pulse signal from the pulse generator 34 to measure the pulse intervals of the pulse signal indicative of time intervals between detections of the stripes S that sequentially pass through the pattern detector 31, and to output a time-interval signal (track detection signal) $\Delta t_i$ ($\Delta t_1$, $\Delta t_2$, $\Delta t_3$, . . . ) to the processing unit 40.

The processing unit 40 includes a PES calculation unit (arithmetic unit) 42, a determination unit 43, a storage unit 44, and an interface unit (peripheral device connection terminal) 45. The processing unit 40 is configured to determine an oscillation amount $\Delta L$ of the servo track ST written on the magnetic tape MT, from the track detection signal (time-interval signal $\Delta t_i$) output from the measurement unit 30, to thereby make a determination as to whether the servo track ST is formed within a permissible range of deviation on the magnetic tape MT. Hereupon, "PES" of the PES calculation unit 42 is the abbreviated name of position error signal as will be described later.

Figure 3:
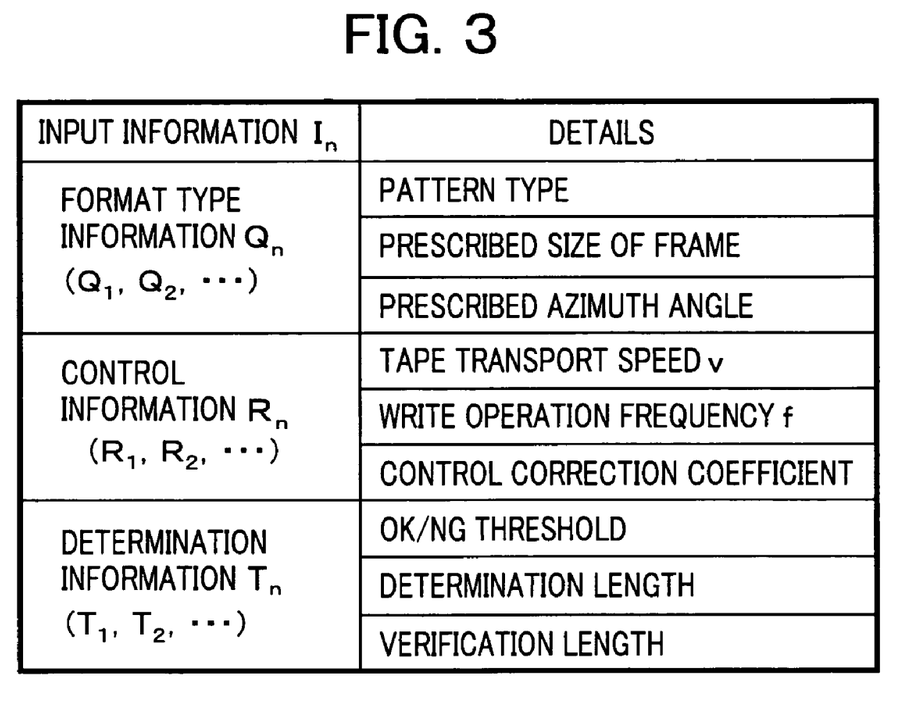
FIG. 3 is a table showing details of input information provided through an input unit of a servo track verification apparatus according to an exemplified embodiment of the present invention.

The input unit 51 is a device allowing a user to input information, and may for example include a keyboard, a mouse, an input tablet, etc. which can be operated by the user. Through the input unit 51 is provided input information $I_n$ as shown in FIG. 3. In this embodiment, the input information $I_n$ provided through the input unit 51 includes format type information $Q_n$, control information $R_n$, and determination information $T_n$.

The format type information includes information on a pattern type of a servo track ST, a prescribed size of a frame $N_i$, $N_k$, a prescribed azimuth angle of a magnetic gap G of the head (i.e., stripes S), and so on, which represents unique properties of the servo patterns as shown in FIGS. 2B and 2C. The control information $R_n$ includes information on a tape transport speed, a write operation frequency f, a control correction coefficient, and so on. The determination information $T_n$ includes information on a threshold indicative of the permissible range of deviation of the servo track ST as used to make a determination as to whether the servo track ST is formed within a permissible range of deviation on the magnetic tape MT (tape-like recording medium), a determination length indicative of a unit length of the magnetic tape MT in which the determination is made, and a verification length indicative of a unit length of the magnetic tape MT with which one cycle of verification steps deals.

The display unit 52 in this embodiment is an exemplified output unit configured to allow a user to input information through the input unit 51 with graphic user interface by providing on screen a menu of options of information such as the format type information $Q_n$, control information $R_n$, and determination information $T_n$ as described above. The display unit 52 may further have the functions of graphically representing the oscillation amount $\Delta L$ of the servo track ST as determined by the processing unit 40, and the results of determination made by the determination unit 43 of the processing unit 40 which include failure/no-failure information as well as failed location information, i.e., information as to which portion, if any, of the servo track ST is formed in the magnetic tape MT beyond the permissible range of deviation (oscillation amounts). The output unit as exemplified by this display unit 52 may be configured to allow the user to see at least one of the following information: (1) the information $I_n$ input by the user through the input unit 51, (2) the oscillation amount $\Delta L$ determined by the PES calculation unit 42 of the processing unit 40, and (3) the determination made by the determination unit 43 of the processing unit 40 as to whether the servo track is formed within the permissible range of deviation. The output unit may for example be a general-purpose printer or display unit adapted to output the above information.

The PES calculation unit 42 is configured to determine an oscillation amount $\Delta L_i$ (see FIG. 2B, for example) of the servo track ST from the time-interval signal $\Delta t_i$ (track detection signal) output from the measurement unit 30, using a function $F_n$. The oscillation amount $\Delta L_i$ is a deviation, from a reference trajectory m indicated by a solid line, of the trajectory n (see FIG. 2B) of the write element (write head 23b as illustrated in FIG. 2B of the pattern detector 31 as shown in FIG. 1) passing across the stripes S in actuality. The oscillation amount $\Delta L_i$ is determined as a position error signal or PES value which is a function $F_n$ as is expressed for example by Equation (1):

$$\text{PES value: } F_n = ((A_i\_\text{interval} \div B_i\_\text{interval}) - X_n) \times Y_n \qquad (1)$$

where $X_n$ is a reference value of ($A_i$_interval÷$B_i$_interval) exhibited when the trajectory n exactly traces the reference trajectory m, $Y_n$ is a constant derived from the control information $R_n$. In FIG. 2B, $A_i$_interval is indicated by intervals $A_{b1}$ and $A_{b2}$ for frames $N_{b1}$ and $N_{b2}$, respectively. The function $F_n$ is unique to a specific format type of servo patterns, and thus is uniquely determinable by the format type information $Q_n$ information to be provided through the input unit 51.

The determination unit 43 is configured to make a determination as to whether each portion of the servo track ST is formed within a permissible range of deviation, based on the oscillation amount $\Delta L$ determined by the PES calculation unit 42, using determination information $T_n$ provided through the input unit 51.

The storage unit 44 retrievably stores a plurality of functions $F_n$ ($F_1, F_2, \ldots$) corresponding to servo patterns of the servo track ST in a manner that permits addition, update and maintenance of registered records of functions $F_n$. One function $F_n$ may be selected from among the plurality of functions $F_1, F_2, \ldots$ stored and registered in the storage unit 44, on the basis of the format type information $Q_n$, and control information $R_n$ as needed, provided through the input unit 51.

The interface unit 45 is a connection terminal connection terminal which provides connectivity with peripheral devices such as CD drives, flexible disk drives, web servers on the Internet, and other resources in which functions $F_n$ are retrievably stored. Through the interface unit 45, a function $F_n$ corresponding to the information provided through the input unit 51, which is stored in such outside resources, particularly a function $F_n$ other than the plurality of functions $F_n$ stored in the storage unit 44, can be loaded.

Figure 4:
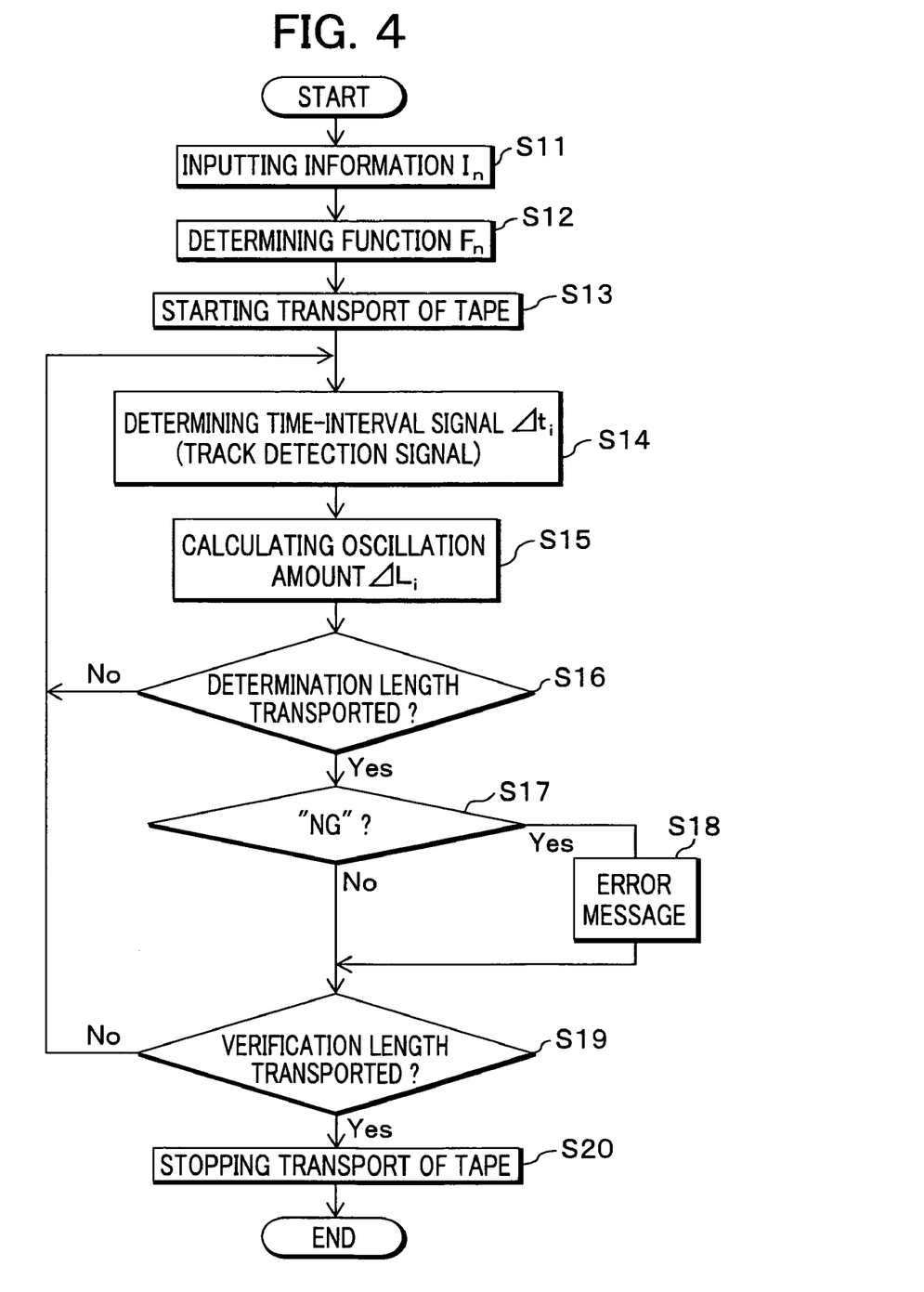
FIG. 4 is a flowchart for explaining a servo track verification method or an operation of a servo track verification apparatus according to an exemplified embodiment of the present invention.

Referring to FIGS. 1 and 4, an operation of the servo track verification apparatus 10 according to an exemplary embodiment of the present invention will be described.

First, an operator (user) inputs information In through the input unit 51 (S11). A function $F_n$ is determined (e.g., retrieved from the storage unit 44) on the basis of information $I_n$ (the format type information $Q_n$, and if necessary, the control information $R_n$) provided through the input unit 51 (S12).

Next, the tape drive unit 20 start causing the magnetic tape to run on a predetermined route (S13), and the measurement unit 30 detects a servo track ST written on the running magnetic tape (tape-like recording medium) MT and measures time intervals of detections of servo patterns of the servo track ST to output a time-interval signal (track detection signal) $\Delta t_i$ (S14).

Then, the PES calculation unit 42 calculates an oscillation amount $\Delta L_i$ of the servo track ST from the time-interval signal (track detection signal) $\Delta t_i$, using a function $F_n$ as determined in step S12 (S15).

Determination of the time-interval signal $\Delta t_i$ in step S14 and calculation of the oscillation amount $\Delta L_i$ in step S15 are repeated until a predetermined unit length (determination length) of the magnetic tape MT has been transported for one determination process (S16). A determination is made for the determination length of the magnetic tape MT, and if the result of determination indicates "NG" (i.e., the portion of the magnetic tape MT fails to have a servo track ST formed within a permissible range of deviation), an error message is issued (S17, 18). The determination in step S16 is repeated until a predetermined unit length (verification length) of the magnetic tape MT has been transported for one verification process (S19). When every determination in step S17 for the verification length of the magnetic tape MT is completed, the tape drive unit 20 stops transport of the magnetic tape MT (S20).

Second Embodiment

Figure 5:
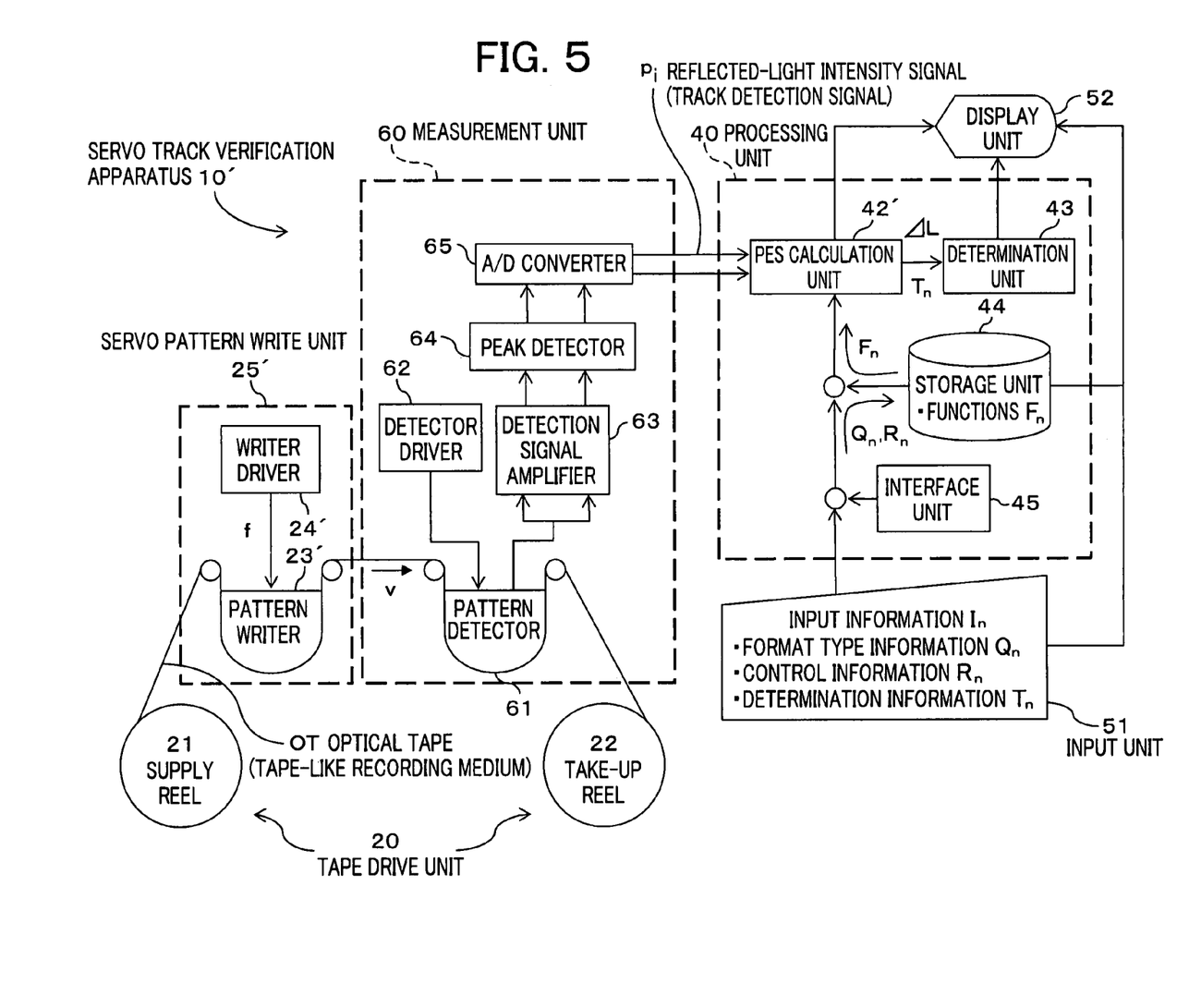
FIG. 5 is a block diagram showing principal components of a servo track verification apparatus or a servo writer for inspecting optical servo patterns, according to a second exemplified embodiment of the present invention.
Figure 6A:
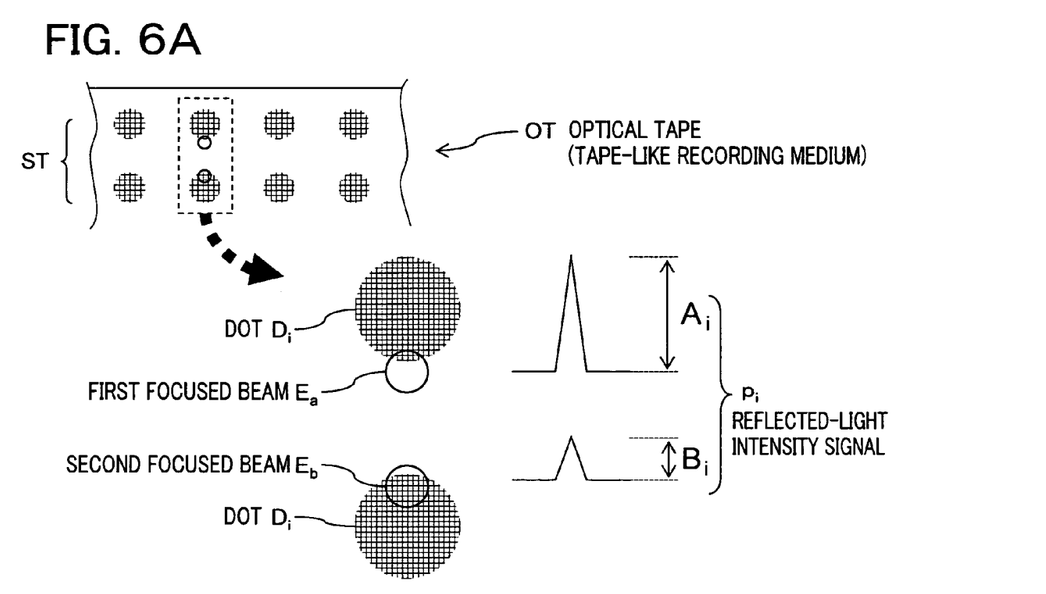
FIG. 6A is a diagram of an exemplified format type of optical servo patterns written in a servo track.
Figure 6B:
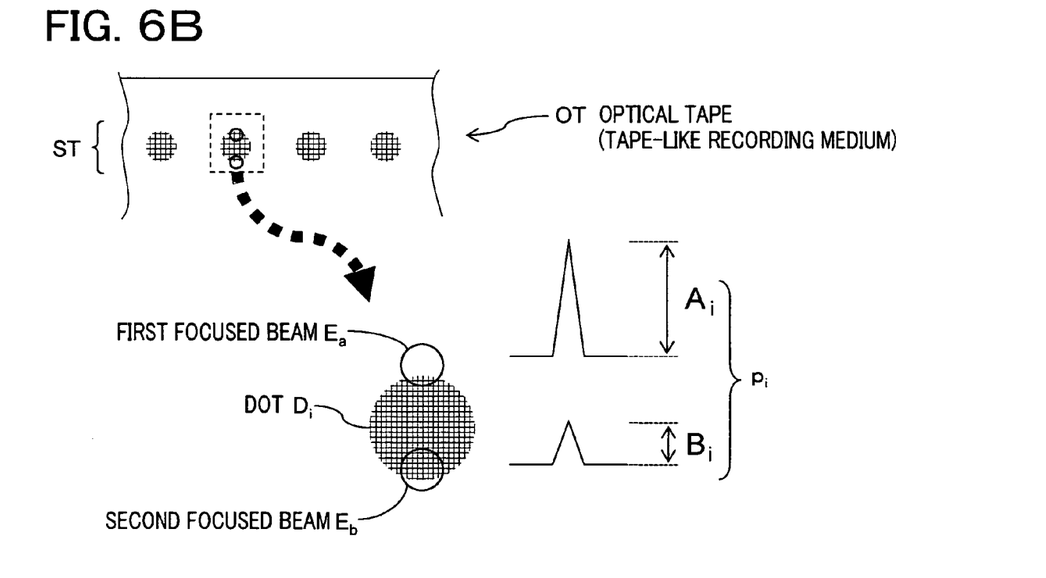
FIG. 6B is a diagram of another exemplified format type of optical servo patterns written in a servo track.

Referring now to FIGS. 5 and 6, a servo track verification apparatus as a second embodiment of the present invention will be taken up for discussion. FIG. 5 is a block diagram showing principal components of a servo track verification apparatus or a servo writer for inspecting optical servo patterns, according to the second embodiment of the present invention. Components corresponding to those shown in FIG. 1 are designated by the same reference numerals, and a duplicate description thereof is omitted herein. FIGS. 6A and 6B show exemplified format types of optical servo patterns written in a servo track ST on an optical tape (tape-like recording medium) OT.

In the illustrated embodiment, the servo track ST formed on the optical tape OT is comprised of a series of dots $D_i$ corresponding to frames $N_i$ (see FIG. 2) of servo track ST formed on the magnetic tape MT. The dots $D_i$ are arranged at regular spacings along the length of the optical tape OT. A crystalline resin layer forms a recording surface of the optical tape OT, and the dots $D_i$ are formed in the crystalline resin layer of the optical tape OT. The dots $D_i$ in the servo track ST may be arranged in two rows as shown in FIG. 6A; alternatively, the dots $D_i$ in the servo track ST may be arranged in a single row as shown in FIG. 6B.

A pattern writer 23' is configured to emit a laser beam focused to a small cross section onto the optical tape (tape-like recording medium) OT, so that a portion of the crystalline resin layer to which the laser beam is focused is changed into an amorphous state by the action of thermal energy. Thus, the impact of the focused laser beam emitted from the pattern writer 23' instantaneously affects a small area on the running optical tape OT and forms a spot-like dot $D_i$ which is arranged in series as shown in FIGS. 6A and 6B on the optical tape OT.

A writer driver 24' is connected with the pattern writer 23' and configured to cause the focused beam emitted from the pattern writer 23' to blink with a write operation frequency f. Spacings between adjacent dots $D_i$ formed along the length of the servo track ST are determined by the write operation frequency f and the transport speed v of the optical tape OT.

A measurement unit 60 provided in the servo track verification apparatus 10' according to the second embodiment includes a pattern detector 61, a detector driver 62, a detection signal amplifier 63, a peak detector 64, an analog-to-digital converter 65. The measurement unit 60 is configured to measure intensities of light reflected from areas on the running optical tape OT where the dots $D_i$ are provided which dots $D_i$ are formed in servo tracks ST on the running optical tape OT and sequentially passes through the measurement unit 60.

The pattern detector 61 includes a light-emitting element directing two beams of low-energy laser light toward the areas on the running optical tape OT where the dots $D_i$ are provided and a light-receiving element detecting the two beams of low-energy laser light reflected from the running optical tape OT. Hereupon, "low-energy laser light" is light with energy so low that a portion of the crystalline resin layer to which it is focused is not changed into an amorphous state. The aforementioned two beams of low-energy laser light are illustrated as a first focused beam $E_a$ and a second focused beam $E_b$, in FIGS. 6A and 6B. In the example where dots $D_i$ are formed in two rows as shown in FIG. 6A, the first and second focused beams $E_a$ and $E_b$ are aimed at points at which a line produced between centers of two reference dots intersects with the circumferences of the reference dots. Similarly, in the example where dots $D_i$ are formed in a single row as shown in FIG. 6B, the first and second focused beams $E_a$ and $E_b$ are aimed at points at which a transverse line (perpendicular to the longitudinal direction of the optical tape OT) passing through the center of a reference dot intersects with the circumference of the reference dot. Hereupon, "reference dot" is a hypothetical dot precisely located in a predetermined position on the optical tape OT running without deviation (oscillation) in the transverse direction of the running optical tape OT.

The light-receiving element of the pattern detector 61 is disposed so that the first and second focused beams $E_a$ and $E_b$ reflected from the optical tape OT strike the light-receiving element, respectively; the pattern detector 61 is configured to measure energies of the reflected beams detected by the light-receiving element, and to output an analog reflected-light intensity signal $p_i$ according to intensities of the energies of the reflected beams.

The detector driver 62 connected with the pattern detector 61 as shown in FIG. 5 is configured to power the pattern detector 61 so that the pattern detector 61 operates as described above.

The detection signal amplifier 63 connected with the pattern detector 61 as shown in FIG. 1 is configured to receive the reflected-light intensity signal $p_i$ output from the light-receiving element of the pattern detector 61 as described above, and to amplify the reflected-light intensity signal $p_i$. The amplified reflected-light intensity signal $p_i$ distinctly indicates intensities of the reflected light, clearly showing a variation in overlapped area of irradiated spots with the dots $D_i$ such that the narrower the overlapped area (as of the spot irradiated with the first focused beam $E_a$ shown in FIG. 6A), the higher does the intensity of the reflected light become, thus making the intensity $A_i$ of the reflected-light intensity signal $p_i$ higher as shown in FIG. 6A, while the broader the overlapped area (as of the spot irradiated with the second focused beam $E_b$ shown in FIG. 6B), the lower does the intensity of the reflected light become, thus making the intensity $B_i$ of the reflected-light intensity signal $p_i$ lower as shown in FIG. 6B. Accordingly, when a servo track ST is formed on an optical tape OT (tape-like recording medium) with deviation (oscillation) in the transverse direction of the optical tape OT, it is observed that an intensity ratio $A_i/B_i$ of the reflected-light intensity signal $p_i$ received by the detection signal amplifier 63 and output therefrom as an amplified analog intensity signal varies according to the oscillation amount of the servo track ST.

The peak detector 64 is configured to track the amplified analog intensity signal (reflected-light intensity signal $p_i$ as shown in FIGS. 6A and 6B) output from the detection signal amplifier 63, sample a highest value of the amplified analog intensity signal, and holding the highest value for a predetermined period of time. The analog-to-digital converter 65 is configured to convert the highest value of the amplified analog intensity signal output from the peak detector 64 into a digital value, which can be dealt with by the processing unit 40.

Although the exemplary embodiments of the present invention have been described above, various modifications and changes may be made in the present invention without departing from the spirit and scope thereof.

A magnetic track-following servo system and an optical track-following servo system have been taken up for discussion by way of example in the above description; however, the track-following servo systems for a tape-like recording medium applicable to the present invention are not limited thereto.

According to the present invention, as embodied in servo track verification apparatuses 10, 10', the necessity for replacing the existing verification apparatus with one corresponding to a different format type of servo tracks ST can be obviated. Instead, all the user (operator) should do in order to conducting verification testing of servo tracks ST of a variety of format types formed on a tape-like recording medium (e.g., magnetic tape MT, optical tape OT) using only one inventive servo track verification apparatus 10 or 10', is to input information $I_n$ through the input unit, and to download a desired function from outside resources if necessary. Further, if a servo pattern write unit 25, 25' is provided in a position upstream of the measurement unit 30, 60 adjacent to the predetermined route of the tape-like recording medium MT, OT, to write the servo track on the running tape-like recording medium MT, OT, a servo writer capable of quantitatively measuring an oscillation amount $\Delta L_j$, $\Delta L_k$ of servo tracks ST formed on a tape-like recording medium MT, OT, immediately after the servo patterns SP are written in servo tracks ST on the tape-like recording medium MT, OT can be provided.

What is claimed is:

1. A servo track verification apparatus for verifying a servo track formed on a tape-like recording medium, comprising:

an input unit allowing a user to input information;

a tape drive unit causing the tape-like recording medium to run on a predetermined route;

a measurement unit provided adjacent to the predetermined route of the tape-like recording medium and configured to detect the servo track on the running tape-like recording medium driven by the tape drive unit, to output a track detection signal;

a storage unit storing a plurality of functions each of which is uniquely determinable by the information to be provided through the input unit; and an arithmetic unit configured to determine an oscillation amount of the servo track from the track detection signal output from the measurement unit, using a function determined on the basis of the information provided through the input unit, the function used for determining the oscillation amount of the servo track being retrievable from among the plurality of functions stored in the storage unit.

2. A servo track verification apparatus according to claim 1, wherein the tape-like recording medium comprises a magnetic tape;
wherein the servo track formed on the magnetic tape comprises a series of frames each composed of two or more slanting stripes including at least one pair of nonparallel stripes; and
wherein the track detection signal comprises a time-interval signal indicative of time intervals between detections of the stripes on the running magnetic tape, the time intervals being measured by the measurement unit when the stripes sequentially pass through the measurement unit.

3. A servo track verification apparatus according to claim 2, wherein the measurement unit comprises:
a pattern detector provided adjacent to the predetermined route of the magnetic tape to detect the stripes on the running magnetic tape and output an analog detection signal;
a detector driver connected with the pattern detector to power the pattern detector;
a detection signal amplifier amplifying the analog detection signal output from the pattern detector to output an amplified analog signal;
a pulse generator converting the amplified analog signal output from the detection signal amplifier into a pulse signal; and
a pulse interval timer receiving the pulse signal to measure pulse intervals of the pulse signal indicative of the time intervals between the stripes that sequentially pass through the pattern detector, and outputting the time-interval signal as the track detection signal to the arithmetic unit.

4. A servo track verification apparatus according to claim 1, wherein the tape-like recording medium comprises an optical tape;
wherein the servo track formed on the optical tape comprises a series of dots; and
wherein the track detection signal comprises an intensity signal indicative of intensities of light reflected from areas on the running optical tape where the dots are provided, the intensities of light being measured by the measurement unit when the dots sequentially pass through the measurement unit.

5. A servo track verification apparatus according to claim 4, wherein the measurement unit comprises:
a pattern detector comprising a light-emitting element directing two beams of low-energy laser light toward the areas on the running optical tape where the dots are provided and a light-receiving element detecting the two beams of low-energy laser light reflected from the running optical tape, to output an analog intensity signal indicative of intensities of the two beams of low-energy laser light detected by the light-receiving element;
a detector driver connected with the pattern detector to power the pattern detector;

a detection signal amplifier amplifying the analog intensity signal output from the pattern detector to output an amplified analog intensity signal;
a peak detector tracking the amplified analog intensity signal output from the detection signal amplifier, sampling a highest value of the amplified analog intensity signal and holding the highest value for a predetermined period of time; and
an analog-to-digital converter converting the highest value held for the predetermined period of time by the peak detector into a digital value, and outputting the digital value as the intensity signal to the arithmetic unit.

6. A servo track verification apparatus according to claim 5, wherein the light-emitting element of the pattern detector is configured to direct the two beams of low-energy laser light toward spots on or outside opposite side edges of the dots formed on the running optical tape.

7. A servo track verification apparatus according to claim 1, wherein the information provided through the input unit comprises information of at least one type selected from the group consisting of format type information, control information and determination information.

8. A servo track verification apparatus according to claim 7, wherein the arithmetic unit is configured to determine the function on the basis of one of format type information provided through the input unit, and combination of the format type information and control information provided through the input unit.

9. A servo track verification apparatus according to claim 7, wherein the control information comprises a tape transport speed, a write operation frequency and a control correction coefficient.

10. A servo track verification apparatus according to claim 1, further comprising:
an interface unit providing connectivity with at least one peripheral device through which a function other than the plurality of functions stored in the storage unit is loadable.

11. A servo track verification apparatus according to claim 1, wherein the information provided through the input unit comprises a function other than the plurality of functions stored in the storage unit.

12. A servo track verification apparatus according to claim 11, wherein the arithmetic unit is configured to determine the function on the basis of one of format type information provided through the input unit, and combination of the format type information and control information provided through the input unit.

13. A servo track verification apparatus according to claim 1, further comprises a determination unit configured to make a determination as to whether the servo track is formed within a permissible range of deviation, based on the oscillation amount of the servo track determined by the arithmetic unit, using determination information provided through the input unit, wherein the determination information comprises a threshold indicative of the permissible range of deviation of the servo track.

14. A servo track verification apparatus according to claim 13, wherein the determination information further comprises at least one of a determination length indicative of a unit length of the tape-like recording medium in which determination is made, and a verification length indicative of a unit length of the tape-like recording medium with which one cycle of verification steps deals.

15. A servo track verification apparatus according to claim 13, further comprising an output unit allowing the user to see at least one of the information input by the user, the oscillation amount determined by the arithmetic unit, and the determination made by the determination unit as to whether the servo track is formed within the permissible range of deviation.

16. A servo track verification apparatus according to claim 1, wherein the arithmetic unit is configured to determine the function on the basis of one of format type information provided through the input unit, and combination of the format type information and control information provided through the input unit.

17. A servo track verification apparatus according to claim 1, further comprising an output unit allowing the user to see at least one of the information input by the user, and the oscillation amount determined by the arithmetic unit.

18. A servo writer comprising:
  a servo track verification apparatus according to claim 1; and
  a servo pattern write unit provided in a position upstream of the measurement unit adjacent to the predetermined route of the tape-like recording medium, to write the servo track on the running tape-like recording medium.

19. A servo track verification method for verifying a servo track formed on a tape-like recording medium, comprising:
  allowing a user to input information through an input unit, wherein the information comprises format type information and determination information;
  determining a function on the basis of one of the format type information, and combination of the format type information and control information provided through the input unit;
  causing the tape-like recording medium to run on a predetermined route;
  detecting the servo track on the running tape-like recording medium to output a track detection signal;
  determining an oscillation amount of the servo track from the track detection signal using the function determined; and
  making a determination as to whether the servo track is formed within a permissible range of deviation, based on the oscillation amount of the servo track, using the determination information, wherein the determination information comprises a threshold indicative of the permissible range of deviation of the servo track.

20. A servo track verification method according to claim 19, wherein the determining the function comprises at least one of:
  retrieving the function corresponding to the information provided through the input unit, from a storage unit storing a plurality of functions each of which is uniquely determinable by the information to be provided through the input unit;
  loading the function corresponding to the information provided through the input unit, from an outside resource connected through an interface unit which provides connectivity with at least one peripheral device through which a function other than the plurality of functions stored in the storage unit is loadable; and
  allowing a user to input through the input unit the function corresponding to the information provided through the input unit.

* * * * *